United States Patent
Furlotti

(10) Patent No.: US 12,497,203 B2
(45) Date of Patent: Dec. 16, 2025

(54) APPARATUS FOR INSERTING SPOUTED POUCHES IN RECTILINEAR LOADING PROFILES

(71) Applicant: I.M.A. INDUSTRIA MACCHINE AUTOMATICHE S.P.A., Ozzano Dell'Emilia (IT)

(72) Inventor: Filippo Furlotti, Frazione Cazzola (IT)

(73) Assignee: I.M.A. Industria Macchine Automatiche S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/718,601

(22) PCT Filed: Nov. 14, 2022

(86) PCT No.: PCT/EP2022/081733
§ 371 (c)(1),
(2) Date: Jun. 11, 2024

(87) PCT Pub. No.: WO2023/117212
PCT Pub. Date: Jun. 29, 2023

(65) Prior Publication Data
US 2025/0042590 A1 Feb. 6, 2025

(30) Foreign Application Priority Data
Dec. 22, 2021 (IT) .................. 102021000032171

(51) Int. Cl.
*B65B 35/58* (2006.01)
*B65B 43/12* (2006.01)

(52) U.S. Cl.
CPC .............. *B65B 35/58* (2013.01); *B65B 43/12* (2013.01)

(58) Field of Classification Search
CPC ......... B65B 35/56; B65B 35/58; B65B 43/12; B65B 43/14; B65G 2201/0238
See application file for complete search history.

(56) References Cited

U.S. PATENT DOCUMENTS

| 11,267,601 B2 * | 3/2022 | Tamarindo .............. B65B 55/08 |
| 2002/0060136 A1 * | 5/2002 | Hiramoto .............. B65B 43/465 |
| | | 198/678.1 |

(Continued)

FOREIGN PATENT DOCUMENTS

| JP | H05170252 A | 7/1993 |
| WO | 2012028980 A1 | 3/2012 |
| WO | WO-2014171834 A2 * | 10/2014 ........... B65B 61/186 |

OTHER PUBLICATIONS

International Search Report and Written Opinion for International Patent Application No. PCT/EP2022/081733 completed on Feb. 10, 2023.

(Continued)

*Primary Examiner* — Joshua G Kotis
(74) *Attorney, Agent, or Firm* — Carlson, Gaskey & Olds, P.C.

(57) ABSTRACT

An apparatus for inserting spouted pouches in rectilinear loading profiles, comprising: a pouch feeding station with at least one pouch feeder; a station for loading profiles which are longitudinally parallel to the feeding direction and superimposed; an accumulation station, which is interposed between the feeding station and the loading station and comprises at least one overturning device provided with accumulation guides for the pouches and rotatable about a rotation axis which is substantially parallel to the feeding direction; movement means adapted to perform at least one mutual translation between the feeder and the overturning (Continued)

device, so as to load, during mutual translation, one pouch at a time on the accumulation guides.

9 Claims, 13 Drawing Sheets

(56) References Cited

U.S. PATENT DOCUMENTS

| | | | |
|---|---|---|---|
| 2010/0170591 A1* | 7/2010 | Murray | B65B 43/42 |
| | | | 414/222.01 |
| 2013/0160399 A1* | 6/2013 | Rosselli | B65D 5/5052 |
| | | | 53/236 |
| 2016/0059976 A1* | 3/2016 | Nakagawa | B65B 35/24 |
| | | | 198/681 |
| 2016/0083124 A1* | 3/2016 | Last | B65G 37/00 |
| | | | 29/430 |
| 2017/0043891 A1* | 2/2017 | Gebbink | B65B 43/14 |
| 2017/0081064 A1* | 3/2017 | van der Meijden | B65B 7/02 |
| 2017/0283175 A1 | 10/2017 | Gebbink et al. | |
| 2018/0251247 A1* | 9/2018 | Gebbink | B65B 43/16 |
| 2020/0002031 A1* | 1/2020 | Hiramoto | B65B 61/26 |
| 2020/0346807 A1* | 11/2020 | Gebbink | B65B 43/16 |
| 2021/0316922 A1* | 10/2021 | Gebbink | B65D 71/50 |
| 2022/0009714 A1* | 1/2022 | Gebbink | B65G 1/045 |

OTHER PUBLICATIONS

Italian Search Report for Italian Patent Application No. IT102021000032171 completed on Jun. 24, 2022.

* cited by examiner

APPARATUS FOR INSERTING SPOUTED POUCHES IN RECTILINEAR LOADING PROFILES

The present invention relates to an apparatus for inserting spouted pouches in rectilinear loading profiles.

Flexible containers for liquids or powders, used for example for beverages, purees or liquid detergents, may be formed by a pouch made of materials such as aluminum, PE, PP or other thermoplastic materials, and a spout, which serves both to fill the pouch and to empty its contents.

This so-called spouted pouch, once filled with the substance that it is designed to contain, is sealed with a cap or closure. However, the operations of producing the spouted pouch and filling/sealing it are usually not performed at the same time, but at production sites that are far apart.

For this reason it is known to load empty spouted pouches into adapted rectilinear profiles, typically with a C-shaped or H-shaped cross-section, into which the spouts of the pouches are inserted from one end of the profile and made to slide longitudinally toward the other end so as to accumulate the pouches on the profile and essentially have a "comb" of pouches hanging by the spout which protrude transversely on one side of the profile, with the plane of each pouch also arranged transversely with respect to the longitudinal axis of the profile.

These loaded profiles are usually inserted by hand in a box in such a way that the pouch combs interpenetrate, both frontally and laterally, thus reducing, overall, the containment volume required in the box. The box can then be transported to the plant where pouch filling and sealing is performed.

Such a loading solution can be automated, as described for example in PCT International Publication No. WO 2012/028980. In the solution known from said application, the upside-down pouches of a first set are simultaneously pushed, at right angles to their feeding direction, to the bottom of overturning interspaces, which can be raised with respect to the pushing direction and can be turned through 180 degrees to overturn the first series of pouches. Auxiliary guides below the overturning interspaces receive a second series of pouches pushed at right angles to their feeding direction, leaving them upside down. The two series of upright and inverted pouches are thus pushed further downstream within a plurality of pairs of mutually opposite profiles, so that the series of pouches are loaded onto the profiles in a staggered arrangement.

Automated loading solutions of the known type can be improved in terms of speed, particularly to enable their use at the end of a line for continuous production of spouted pouches.

The aim of the present invention is to provide an apparatus for inserting spouted pouches in a plurality of rectilinear profiles that is capable of improving the background art in one or more of the above cited aspects.

Within the scope of this aim, an object of the invention is to provide an apparatus for inserting spouted pouches in rectilinear profiles that can be used as end-of-line apparatus in a spouted pouch production line without constituting a bottleneck.

Another object of the invention is to allow continuous feeding of spouted pouches to the apparatus for inserting them in the rectilinear profiles.

A further object is to allow an insertion of the pouches into stacks of profiles, at the end of the insertion the pouches being superimposed in layers, wherein each layer is composed of pouches that have the same orientation and are partially mutually superimposed, and the orientation of the pouches of one layer is reversed with respect to that of the pouches of the contiguous layers.

Moreover, an object of the present invention is to overcome the drawbacks of the background art in a manner that is alternative to any existing solutions.

Not least object of the invention is to provide an apparatus that is highly reliable, relatively easy to provide, and at competitive costs.

This aim, as well as these and other objects that will become better apparent hereinafter, are achieved by an apparatus according to claim 1, optionally having one or more of the characteristics of the dependent claims.

Further characteristics and advantages of the invention will become better apparent from the description of a preferred but not exclusive embodiment of the apparatus according to the invention, illustrated by way of non-limiting example in the accompanying drawings, wherein.

Figure 1:
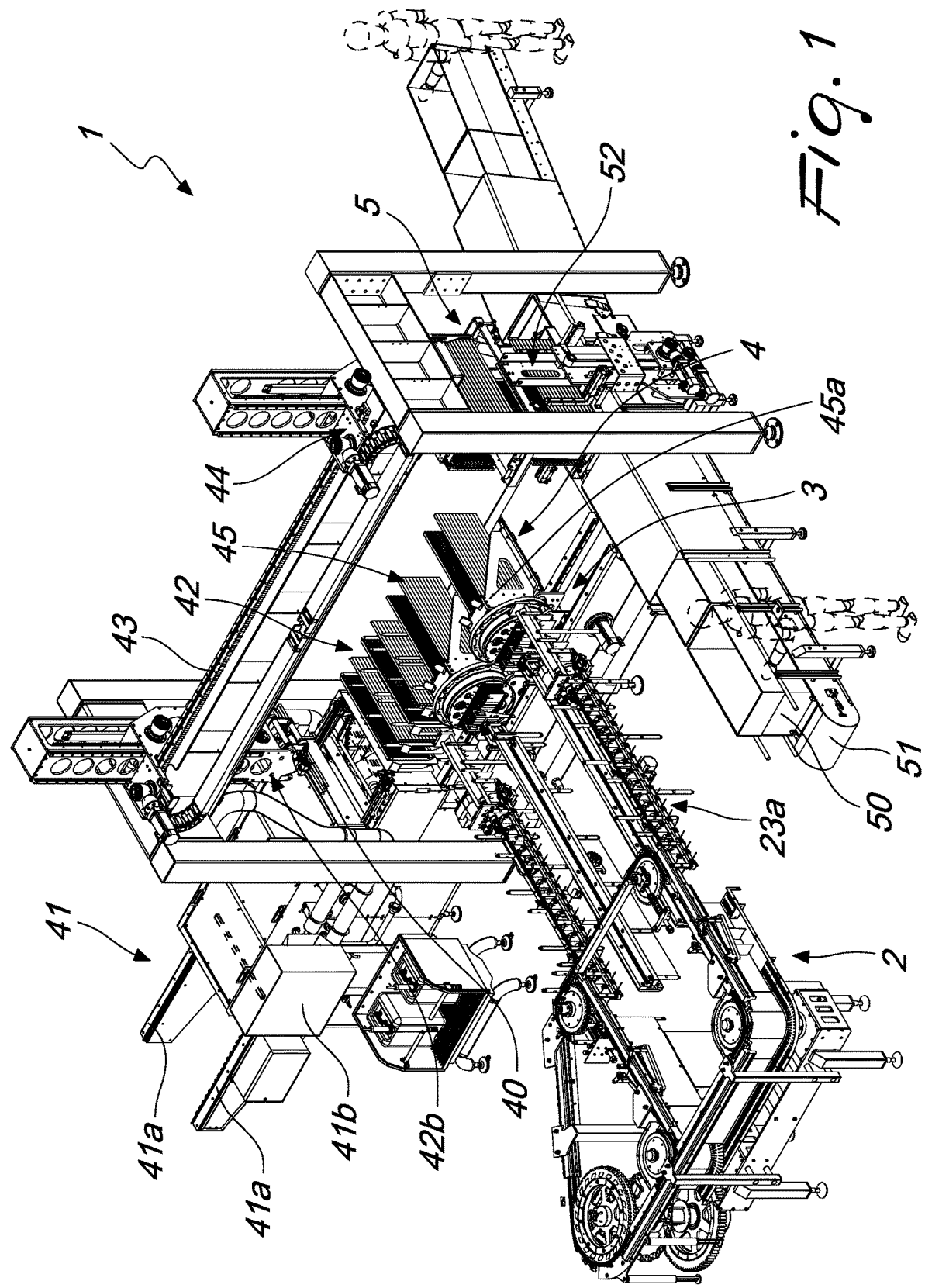
FIG. 1 is a view of an apparatus according to the invention.

With reference to the figures, an insertion apparatus according to the invention, generally designated by the reference numeral 1, comprises a station 2 for feeding spouted pouches 12. Each spouted pouch 12 is substantially composed of a flexible pouch 10 (provided, for example, by two flexible sheets, joined together along the edges and made of materials such as aluminum, PE, PP or other thermoplastic materials, even in multilayer form) and of a spout 11 for access to the inside of the pouch 10, which is made for example of rigid polypropylene and is used both for filling the pouch with liquids, purees, powders or the like and for the outflow of its contents.

The feeding station 2 is adapted to receive a preferably continuous stream of empty spouted pouches 12 that arrives for example from a continuous spouted pouch manufacturing line (not shown), which is connected upstream of the feeding station 2. The upstream manufacturing line may be of the carousel type, for example such as the one described in patent applications US2003/0216235 or JPH10-202768.

For this purpose, the feeding station 2 may comprise at least one chain 20a provided with conveyance brackets 21a which are mutually equidistant and are adapted to grip a respective spout 11 of the pouches 12 that arrive from the upstream manufacturing line, so as to convey the pouch 12, hanging by the spout 11, along a path and release it onto a rectilinear guide. The chain 20a meshes with at least one motorized sprocket 22, which is preferably of the double sprocket type. Multiple guiding sprockets may be provided along the closed path of the chain 20a, for example so as to keep the chain along a quadrangular path, for example substantially shaped like a right trapezoid as in the illustrated case, in which the motorized sprocket 22 is the one with the largest diameter and is located at the pick-up point of the spouted pouches 12 that arrive continuously from the upstream manufacturing line.

In the preferred embodiment, there are two chains 20a and 20b of the feeding station 2, which are vertically superimposed (at least partly) and are each equipped with respective conveyance brackets 21a and 21b which are mutually equidistant along the entire respective chain 20a and 20b and lie substantially on a same horizontal plane, i.e., parallel to the floor on which the apparatus 1 rests. The chains 20a and 20b mesh in respective sprockets of the motorized sprocket 22 and of the other idler sprockets. The pitch of the conveyance brackets 21a along the chain 20a is the same as that of the conveyance brackets 21b of the other chain 20b but is staggered by half a pitch, so as to adapt the set of conveyance brackets 21a and 21b to the (narrower) mutual spacing of the spouted pouches 12 arriving from the end carousel of the manufacturing line located directly upstream of the feeding line 2 and adjacent to the motorized sprocket 22.

Fixed cams may optionally be provided along the paths of the chains 20a-20b to pivot the spouted pouches 12 on themselves, so that the plane of each pouch, when it leaves the respective chain 20a-20b, is substantially perpendicular to a rectilinear feeding direction D of the pouches in the apparatus 1, as shown in the figures.

The feeding station 2 comprises at least one pouch feeder 23a, adapted to cause the advancement of a series of such spouted pouches 12 along the rectilinear feeding direction D and according to a first orientation of the pouches, which in the illustrated case is "head-up," i.e., with the spout 11 directed upward.

In the preferred embodiment, a plurality of said pouch feeders 12 is provided, which are mutually laterally adjacent and are parallel to each other and to the rectilinear feeding direction D; for example, there are two feeders 23a and 23b, as in the case shown, which are substantially mutually identical as regards length and components and are adapted to cause the advancement, along the respective rectilinear feeding direction D and D', of the spouted pouches 12 that arrive from the upstream manufacturing line, which have been, for example, received and transferred in two parallel paths via the two chains 20a and 20b as explained above.

The feeder 23a (as well as the feeder 23b) comprises a respective rectilinear feeding guide 24 adapted to support a series of pouches 12 hanging by the spout 11 to allow them to slide in the feeding direction D. The spouts 11, in fact, are typically provided with a flange 11a or in any case with a radially protruding part which allows automated support and conveyance of the spouted pouches 12. Only the left portion of the guide 24 is shown in the figures, but a right portion (not shown) is of course also provided which also is parallel to the feeding direction D and likewise supports the spouts 11 from below.

To cause the advancement of the spouted pouches 12 along the guide 24, it is preferable to use a conveyor 25 that is continuously movable in a direction of movement that is parallel to the feeding guide 24 and is provided with oscillating rods 26 which are equidistant along the conveyor 25, according to a pitch that is substantially equal to the distance between the spouted pouches 12 that arrive at the inlet of the feeding guide 24. The conveyor 25, which is substantially laterally adjacent to the feeding guide 24, can be a motorized toothed belt closed in a loop, which meshes with sprockets 27 having a vertical rotation axis.

Figure 9:
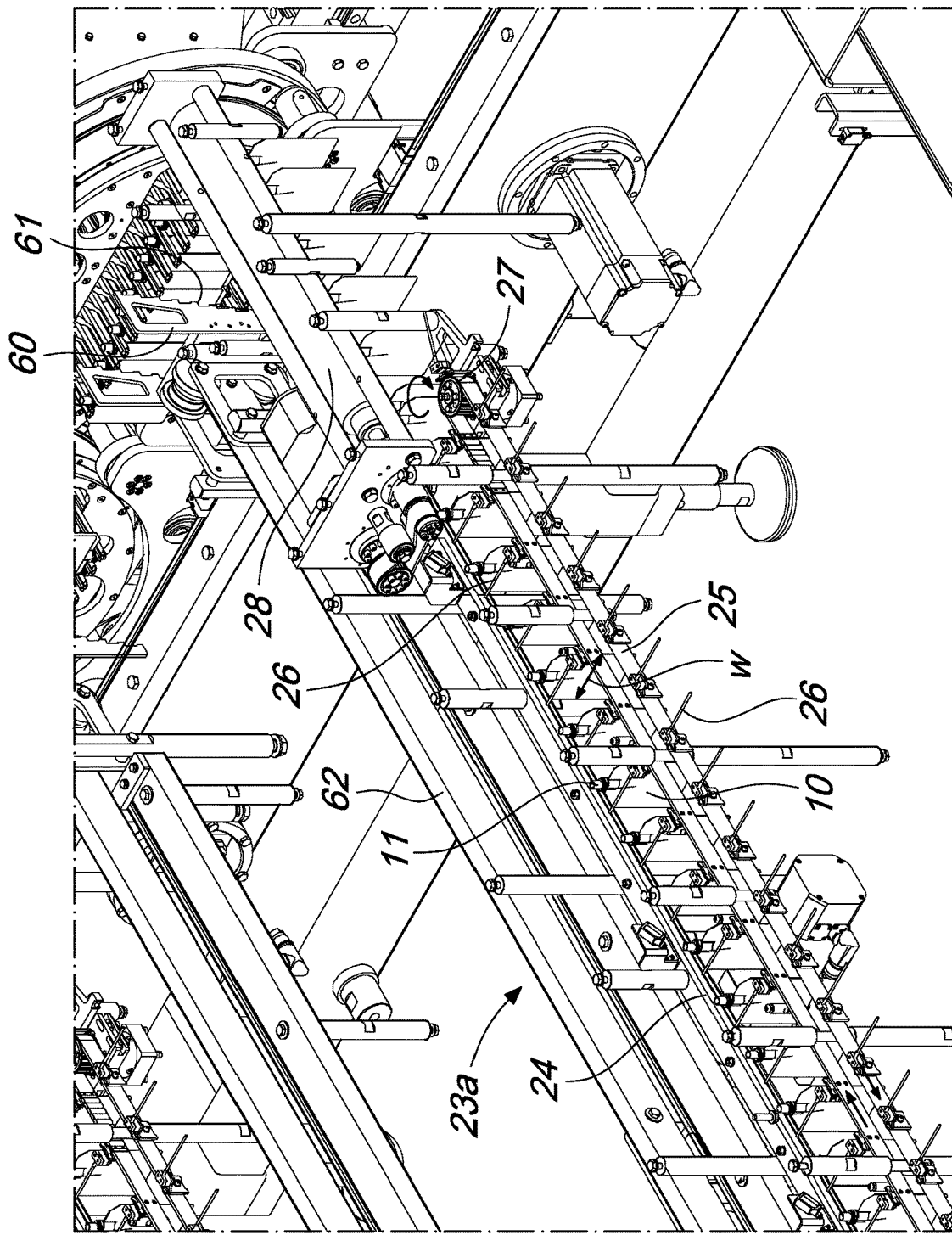
FIG. 9 is a view of a conveyor with elastically pivoting rods for pushing the hanging pouches along the feeding direction.
Figure 10:
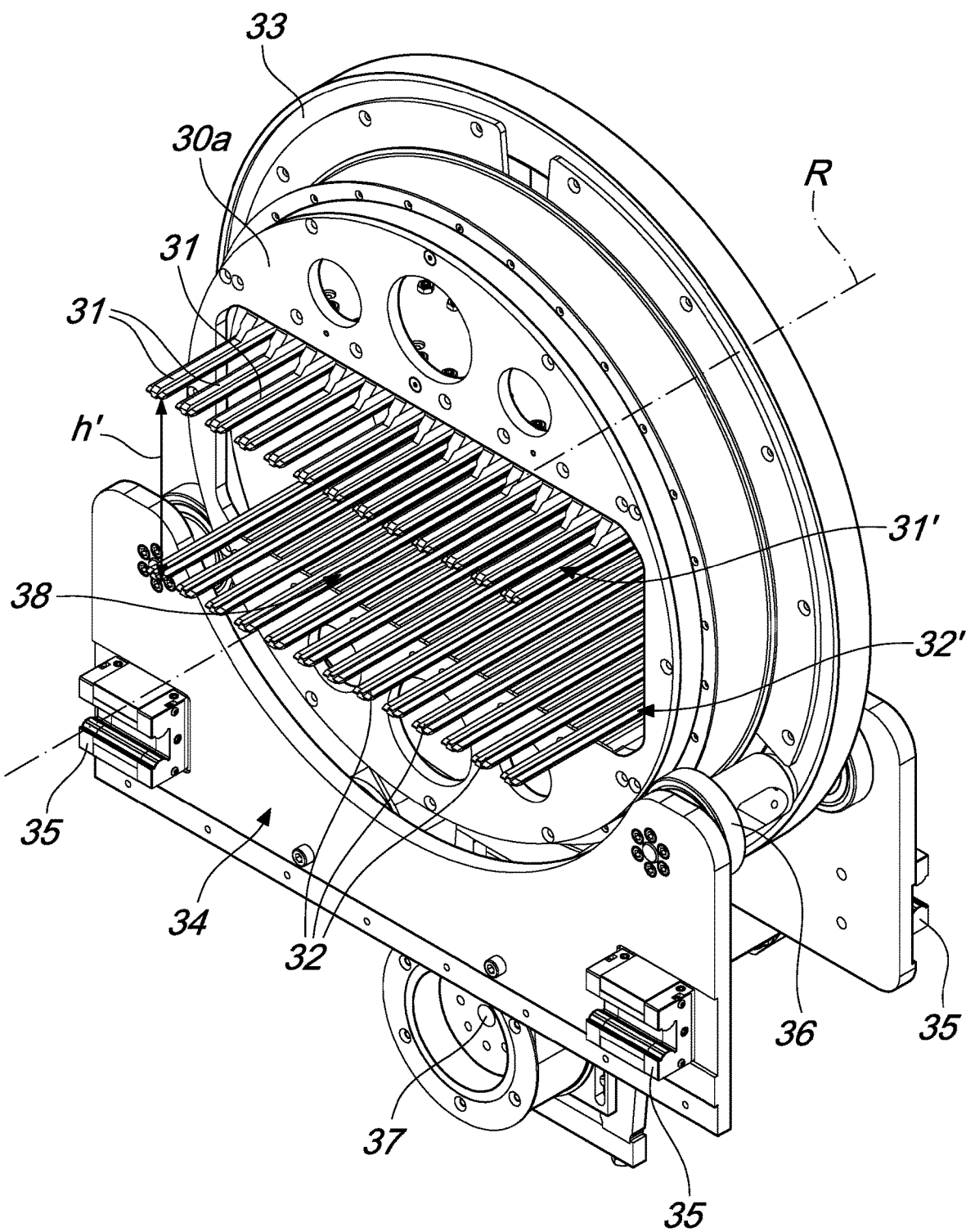
FIG. 10 is a view of one of the overturning devices of the preceding figures.
Figure 11:
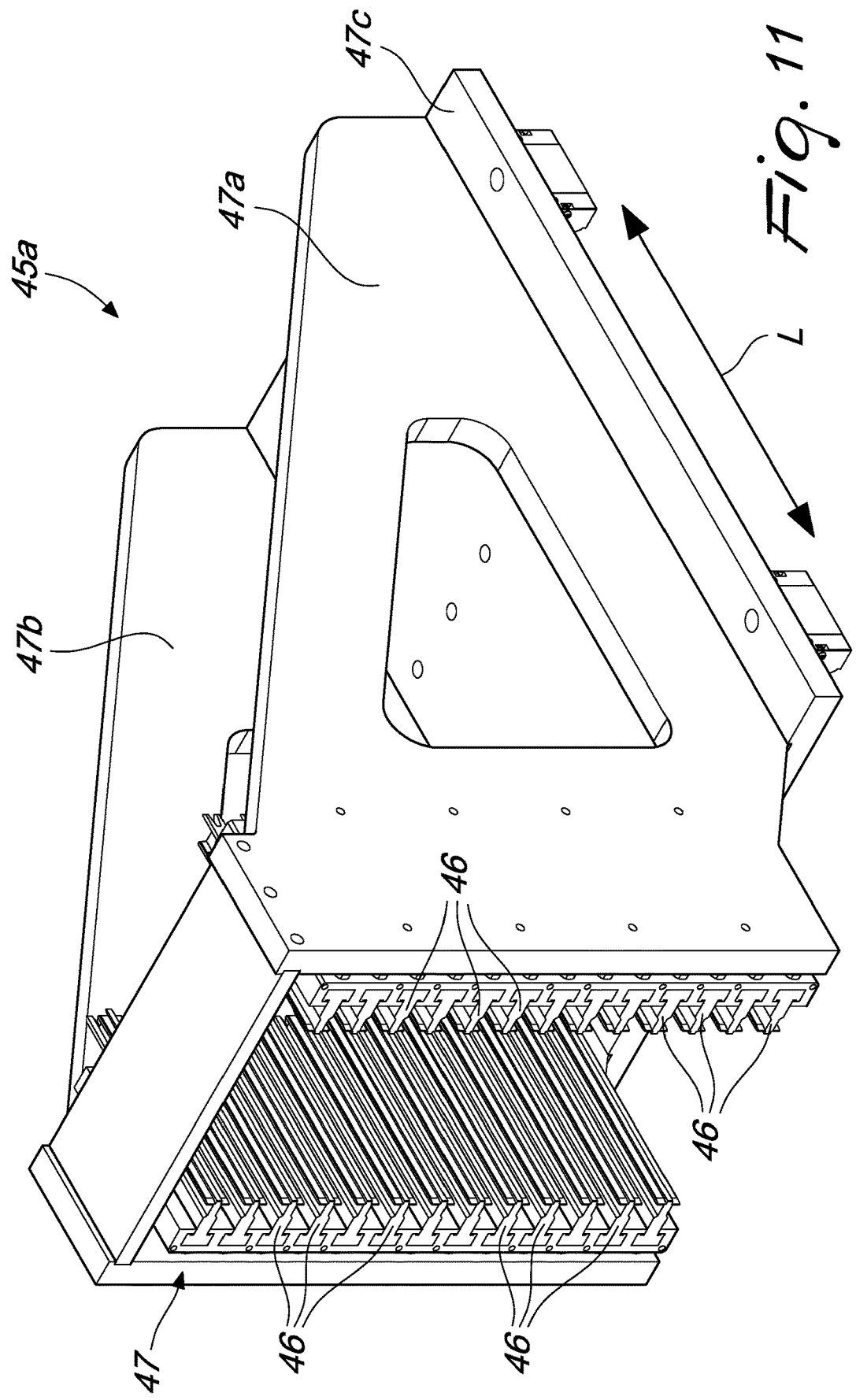
FIG. 11 is a view of an insertion port of the apparatus of the preceding figures.
Figure 12:
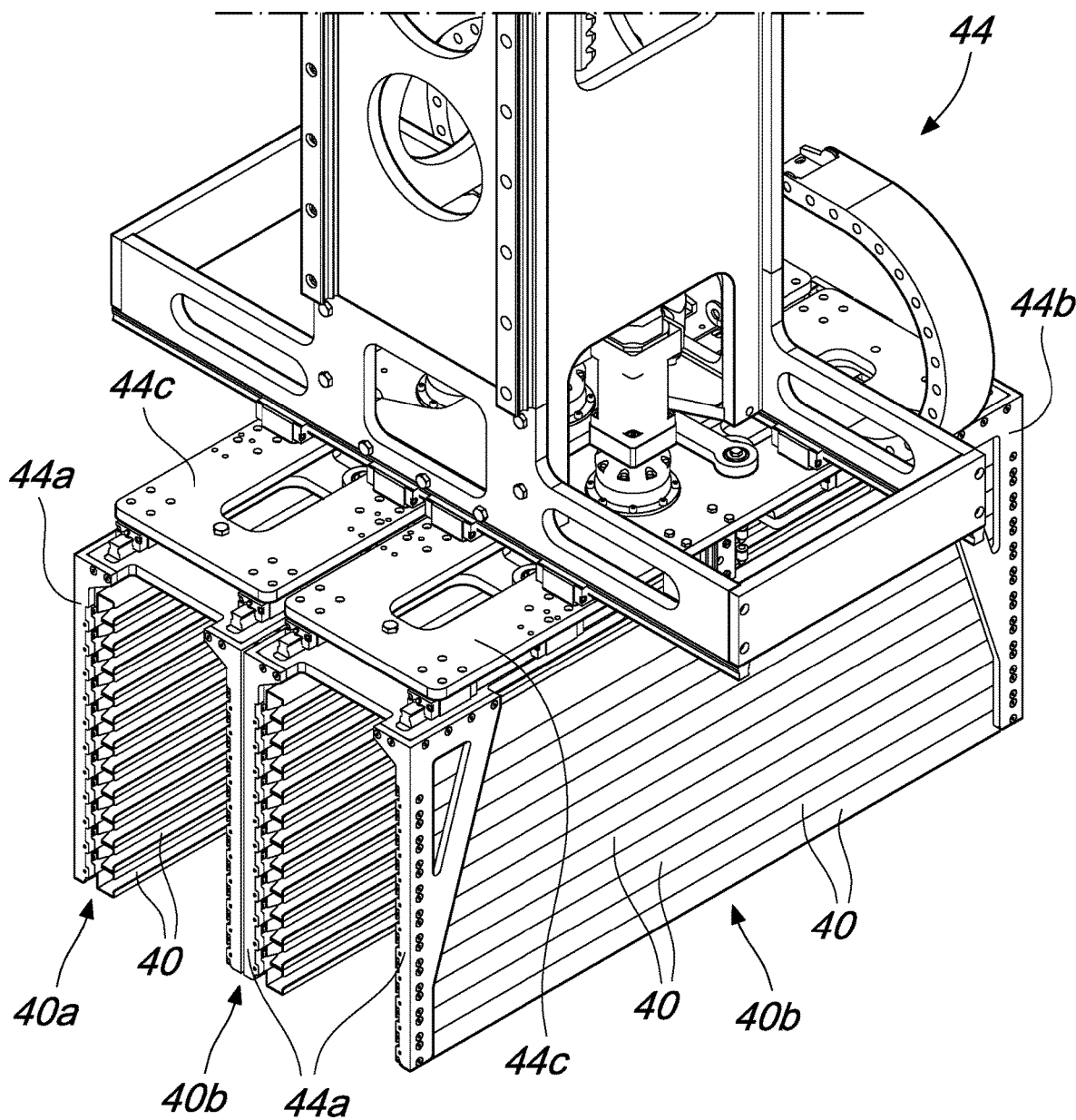
FIG. 12 is a view of a head for loading/unloading stacks of profiles.
Figure 13:
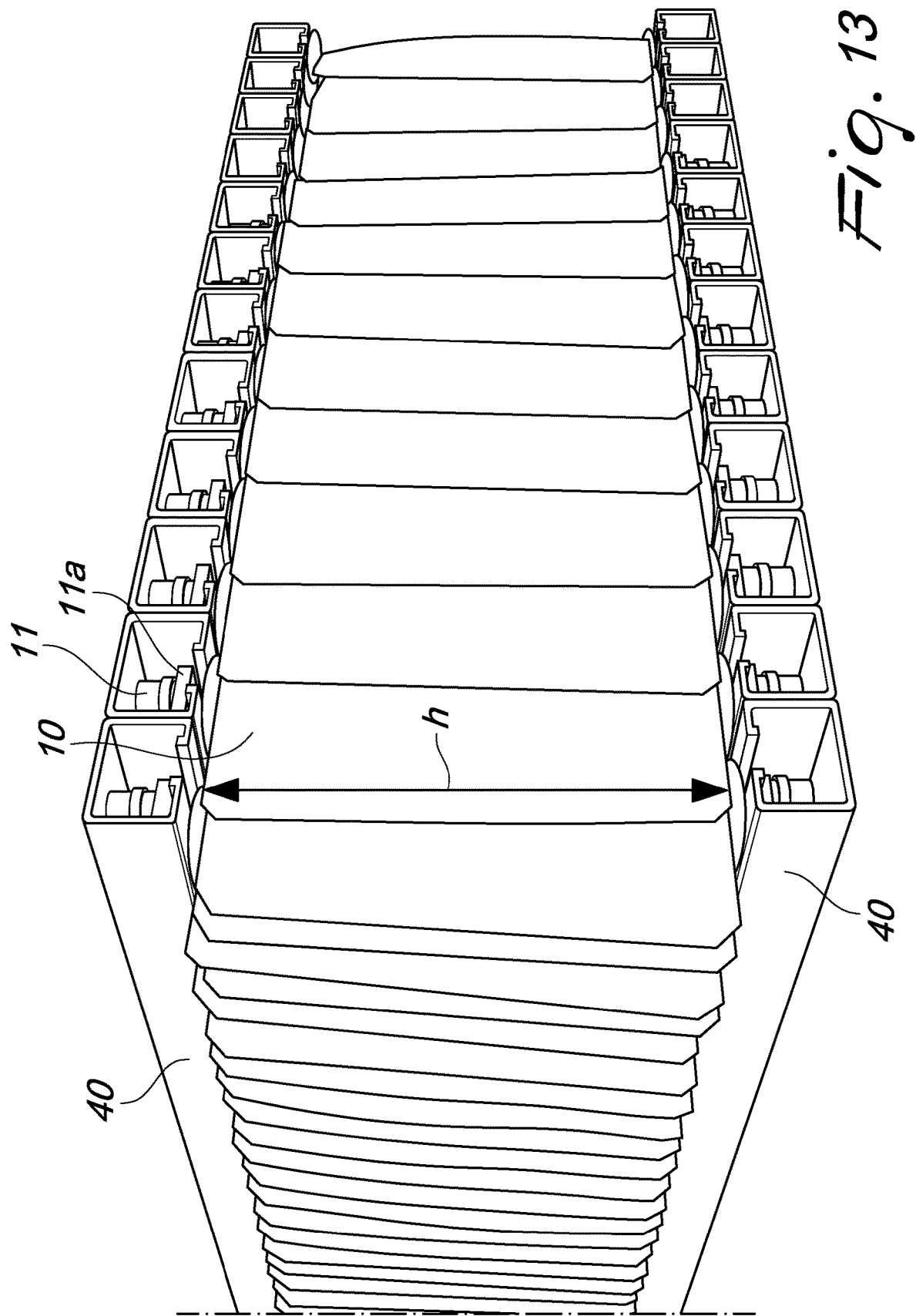
FIG. 13 is a view of the known compacted arrangement of the profiles, with the pouches staggered longitudinally and partially superimposed transversely.

The oscillating rods 26 protrude from the conveyor 25 toward the feeding guide 24 and are adapted to push a respective spouted pouch 12 along the feeding guide 24, in the feeding direction D, by means of the continuous movement of the conveyor 25, which in the figures is clockwise (FIG. 9). By virtue of this thrust it is possible to make the spouts 11 of the pouches 12 slide on the guide 24 even when the spouts 11 are made of a material that generates more friction, such as polypropylene.

Since the rods 26 are mounted (with a constant pitch) along the conveyor 25 so that they can oscillate elastically with respect to a respective vertical axis, this allows to change the inclination of the rods 26 from a resting inclination, substantially perpendicular to the conveyor 25 and to its direction of movement, to an inclination that bends the rod 26 upstream with respect to the conveyor (elastically loading the rod) if a certain threshold of resistance to the sliding of the respective pouch 12 being pushed by the rod 26 is exceeded, for example in the presence of temporary accumulations of pouches in the region of the guide 24 further downstream, for example where the conveyor 25 bends to turn back.

The conveyor 25 with oscillating rods 26 as described above can, more generally, be used in any rectilinear guide feeder (even in packaging lines or apparatuses that are different from the apparatus 1 according to the invention and/or do not necessarily require the loading of the pouches on profiles), as a pusher device to cause the sliding, along a rectilinear guide, of hanging flexible containers (such as empty or filled pouches hanging from said guide) while keeping them mutually equidistant, to overcome the drawbacks of friction and/or of the sail effect associated with alternative systems that use air jets.

As an alternative to the conveyor 25, air jets can be used to make the spouted pouches 12 slide along the feeding guide 24, but said jets are not ideal since, due to the surface extent of each spouted pouch 12, they might cause such a "sail effect" of the pouch 10 as to slow its advancement along the guide 24.

The feeder 23a (as well as the feeder 23b) may additionally comprise a motorized screw feeder 28, which is arranged in a parallel configuration above the end portion that is furthest downstream of the feeding guide 24 in order to engage the upper mouth of the spouts 11 that is left exposed by the guide 24 and rotates continuously to cause the advancement, at a predefined mutual distance, of the spouted pouches 12 along the feeding direction D toward and into an accumulation station 3.

The accumulation station 3 is interposed between the feeding station 2 and a profile loading station 4 and comprises at least one overturning device 30a adapted to change altogether the spatial orientation of a group of spouted pouches 12 arriving from the feeding station 2, orienting them in a manner adapted to insert them altogether in rectilinear loading profiles 40 that are mutually superimposed in the loading station 4.

In the preferred embodiment shown in the drawings there are two of said overturning devices, 30a and 30b, each cooperating with a respective feeder 23a and 23b so as to receive the spouted pouches 12 from it.

Given their identical functionality, only the overturning device 30a will be described, but the same characteristics are intended to be present in the overturning device 30b as well.

The overturning device 30a (and also 30b) is provided with accumulation guides 31-32 for the spouted pouches 12 and is rotatable about an axis of rotation R that is substantially parallel to the rectilinear feeding direction D, in order to change the orientation of the pouches accumulated in the overturning device 30a and allow to release them in a second orientation (substantially rotated through 90° with respect to the first orientation about an axis that is perpendicular to the plane of the respective pouch 10) in the profile loading station 4.

For example, the overturning device 30a (as well as the device 30b) may be a drum, with a central axis that coincides with the axis of rotation R and is rotatably coupled to a base plate 33, for example by means of a ball bearing which is coaxial to the axis of rotation R. The base plate 33 is attached to a shuttle 34 equipped with horizontal sliders 35, which are coupled to rectilinear rails 39 directed parallel to a horizontal direction T that lies on a plane that is perpendicular to the feeding direction D. The overturning device 30a, 30b is thus a combined rotation and translation device.

Each shuttle 34 can be moved automatically along said rails 39 by means of a respective linear motor or a respective electric motor and a rack-and-pinion mechanism, with the rack oriented parallel to the rails 39.

The shuttle 34 may furthermore comprise idler rollers 36 that engage a lateral surface of the overturning device 30a and below it. An electric motor 37 is preferably fixed to the shuttle 34 and coupled by means of an associated transmission, for example of the belt or gear type, to the overturning device 30a to actuate its rotation about the axis R.

The accumulation guides 31 and 32 form rectilinear interspaces which are substantially parallel to each other and to the axis of rotation R associated with each overturning device, and are adapted to receive from the respective feeder 23a a group of pouches 12 with the first orientation (thus head-up, in the case show), retain them by the spout 11, and change their orientation by means of a rotation of the overturning device 30a about the axis R.

The accumulation guides 31 and 32 are located in a through region 38 of the overturning device 30a, are arranged side by side along two parallel rows 31'-32' and face each other, with the axis of rotation R interposed between the two rows.

The distance between one rectilinear interspace and the laterally adjacent one along each row 31' or 32' of accumulation guides is advantageously less than the width "w" of the pouch 10, i.e., the average distance between the opposite edges of the pouch 10 that do not have the spout 11. In this manner, a load of spouted pouches 12 hanging from accumulation guides 31 (or 32) has the pouches 10 partially mutually superimposed along the respective row of guides 31' (or 32'), according to a shingled arrangement.

The two rows 31' and 32' of accumulation guides instead have a distance h' between them that is substantially equal to the height h of the pouch 10 of the spouted pouch 12 or in any case less than twice said height h, i.e., substantially equal to (or less than twice the) maximum distance between the edge of the pouch 10 provided with the spout 11 and the opposite edge. In this way, a second layer of spouted pouches 12 hanging from the second accumulation guides 32 and arranged in a shingled arrangement along the second row 32' is superimposed, at least partly, on the first layer of spouted pouches 12 hanging from the first accumulation guides 31 and arranged in a shingled arrangement along the first row 31', as shown in the figures.

The through region 38 is substantially a parallelepiped tunnel that runs coaxially through the entire overturning device 30a. The row 31' of the first accumulation guides 31 and the row 32' of the second accumulation guides 32 are fixed respectively on two parallel faces of said parallelepiped tunnel (which correspond to the long sides of the substantially rectangular cross-section of the tunnel). The axis of rotation R passes advantageously through the center of the through region 38.

The accumulation guides 31 and 32 moreover advantageously protrude from the through region 38 of each overturning device 30a, 30b toward the respective feeder 23a, 23b of the device, so that the rows 31' and 32', when oriented horizontally, are below the end part of the screw feeder 38 (aligned with the feeding guide 24), thus allowing the loading of pouches 12 from the screw feeder 28 into the accumulation guides of the highest of the two rows 31' or 32'.

The apparatus 1 also comprises movement means adapted to perform at least one mutual translation, along a direction T lying on a vertical plane that is perpendicular to the rectilinear feeding direction D, between the pouch feeder 23a-23b and the respective overturning device 30a-30b, so as to load, during said mutual translation, one pouch at a time of the series of spouted pouches 12 arriving from the respective feeder 23a-23b onto a respective accumulation guide of a first row 31' and, after performing a 180° rotation of the overturning device 30a about the axis R, of the other row 32' of accumulation guides.

Mutual translation can be provided by keeping the feeders 23a-23b in a fixed position and by translating the overturning devices 30a-30b stepwise in the direction T, by means of a stepwise translation of the respective shuttle 34 along the rails 39 such that the respective through region 38 is intersected by the feeding direction D, D' during the mutual translation. At each step of the translation, each feeding direction D-D' is aligned with a respective one of the accumulation guides 31 or 32, in which a respective pouch 12 is inserted (through each screw feeder 28) at the side of its spout 11.

The movement means to achieve said mutual translation comprises a control system for the apparatus 1 (not shown) and the electric motors that allow the shuttles 34 to translate along the rails 39. The control system is preferably also connected to all the other electric motors (of the conveyors, sprockets, screw feeders, etc.) and to the actuation systems of the line, so as to have a centralized control to actuate the synchronized operation of all the stations of the apparatus 1.

The apparatus 1 also comprises pusher means 6a-6b adapted to push spouted pouches into the loading profiles 40. In particular, the pusher means 6a-6b are adapted to pass through said through region 38 to push the spouted pouches 12 that are accumulated (in a layered manner and with alternating orientations) in the accumulation guides 31-32 toward the profile loading station 4, allowing to insert the spouts 11 of the pouches 12 into the profiles 40.

The pusher means 6a, 6b comprise a respective pusher head 60a, 60b, which is arranged laterally adjacent to a respective feeder 23a, 23b and is separate from the respective feeder 23a, 23b. Each pusher head 60a, 60b can move in a linear manner along a pushing direction which is parallel to the feeding direction D, D' and has a front surface 61 that is oblique with respect to the pushing direction. The front surface 61 is oblique so that it is substantially parallel to the front layer of pouches shingled on the accumulation guides 31-32 when they are in an orientation rotated by 90° with respect to the first orientation, following a corresponding rotation of the overturning device 30a, 30b subsequent to the forming of that layer of pouches. The front surface 61, which may optionally also have stepped teeth as shown in the drawings, is thus adapted to abut against substantially all of the pouches 12 that are superimposed in a shingled arrangement in the through region 38 of the respective overturning device 30a-30b, making the thrust along the accumulation guides 31-32 toward the loading station 4 uniform.

To perform the pushing action, the pushing head 61 can be fixed to a respective rectilinear stem 62 associated with a fixed rail 63 placed laterally adjacent to each feeder 23a, 23b. The translation of the stem 62 along the rail 63 can be provided by means of a linear motor, or by means of a motorized rack-and-pinion mechanism, in which, for example, the pinion is in a fixed position and the rack is integral with the stem 62.

The profile loading station 4 comprises a station 41 for inserting rectilinear loading profiles 40, which can be of a per se known type. Such profiles typically have a C-shaped (squared) transverse cross-section and are open at at least one longitudinal end. The free edges of the C-shaped cross-section form an interspace adapted to retain, in the direction at right angles to the longitudinal axis of the profile 40, the pouches 12 on the side of the corresponding spout 11. In practice, said interspace has a width that is smaller than that of the flange 11a of the spouts 11.

The insertion station 41 may comprise at least one conveyor 41a on which to rest, even manually, the rectilinear profiles so that they lie perpendicular to the direction of advancement of the conveyor 41a. The insertion station 41 may advantageously also comprise a sanitizing or otherwise washing chamber 41b, which is crossed by the conveyor 41a.

Preferably, at the exit of the insertion station 41 there is a stacking area 42 of the profiles 40, in which the profiles 40 are placed one above the other between at least two series of containment pins 42a, which keep them stacked. A profile pickup/release head 42b is preferably provided in order to position the profiles 40 from the insertion station 41 to the stacking area 42 so that in each stack 40a, 40b generated in the stacking area 42 the profiles 40 have a concordant orientation of the C-shaped cross-section around the longitudinal axis of the profile, i.e., have the open side of the "C" facing a same face of the stack 40a, and opposite or mirror-symmetrical with respect to the orientation of the C-shaped cross-section of the profiles of the adjacent stack 40b.

Laterally adjacent to or at the stacking area 42 there is an area 45 for loading the spouted pouches 12 in the profiles 40, in which the pouches 12 are inserted from the side of the spout 11 through the longitudinal ends of the profiles of the stacks 40a-40b facing the accumulation station 3.

The automatic pickup/release head 42b of the profiles is movable along an upper crossmember 43 of the loading station 4 by using, for example, a motorized pinion which engages a rack arranged along the upper crossmember 43. The upper crossmember 43 is directed parallel to the rails 39, i.e., to the direction of translation of the overturning device 30a or 30b.

A head 44 for the pickup/release of the stacks 40a-40b is also advantageously movable along the upper crossmember 43 and is adapted to pick up altogether one or more pairs of stacks 40a-40b and place them along the loading station 4 or unload them toward a packing station 5. The stack pick-up/release head 44 is provided with one or more pairs of jaws 44a-44b adapted to clamp simultaneously the opposite ends of the profiles of the stacks 40a-40b. Said pairs of jaws 44a-44b can slide on command (substantially in a direction parallel to the profiles 40, i.e., to the feeding direction D) along a respective plate 44c which is mounted in turn so as to translate on command along the stack pickup/release head 44 in a direction that is parallel to the upper crossmember 43. In this way, two or more pairs of stacks 40a-40b can be automatically moved away or brought closer together to perform a re-pitching between the stacking area 42 and the loading area 45 and/or between the loading area 45 and the packing station 5.

In the loading area 45 there are supporting means 45a-45b adapted to support at least one pair of stacks 40a-40b of profiles so that they are kept directed parallel to the feeding direction D, D' and so that the faces of the two stacks 40a-40b of the pair that have the open part of the C-shaped cross-section of the profiles 40 face each other.

The supporting means 45a-45b comprises a supporting frame having an entry portal 47 provided with a plurality of superimposed linear guiding elements 46 along each vertical side of the portal 47. The number of linear guiding elements 46 that are superimposed vertically on each side of the portal 47 is equal to at least the number of profiles that compose each stack 40a-40b.

Each linear guiding element 46 is adapted to be partially inserted and engaged within the longitudinal end of a respective profile 40 of the stack 40a-40b, so as to form a substantially continuous sliding surface for the spouts 11 of the pouches 12 in the transition between the guiding element 46 and the respective profile 40. The width of the entry portal 47 is such that the distance between the linear guiding elements 46 of one side and those of the other side is substantially equal to the distance h' between the rows 31' and 32' of the accumulation guides.

The entry portal 47 can be obtained by fixing two vertical plates 47a-47b at a distance from each other on a base plate 47c. The base plate 47c is advantageously movable, on command, in a direction L that is parallel to the feeding direction D, D'. This movement is adapted to move the pair of profile stacks 40a-40b closer to/away from the entry portal 47 and allow the pickup/unloading head 44 to grip the stacks at their ends by means of the pair of jaws 44a-44b.

The length of the guiding elements 46 may be such as to contain a plurality of pairs of layers of pouches 12 alternated on each other, in order to utilize each portal 47 as a buffer and then to be able to push, in a later step, this plurality of pairs of layers monolithically into the profiles present on the supporting means 45a-45b within the profile stacks 40a-40b.

Each supporting means 45a-45b is mounted in the loading station 4 so that the respective entry portal 47 is aligned with the respective pusher means 6a, 6b, to allow the pusher head 60a-60b to completely pass through the respective portal 47 and the region between the two profile stacks 40a-40b on the supporting means 45a-45b, i.e., the region comprised between the vertical plates 47a and 47b of the corresponding supporting frame.

The packing station 5 may comprise a conveyor 51 of boxes 50 and an insertion device 52 arranged substantially laterally adjacent to the loading region 45 and provided with movable walls for guiding into each box one or more pairs of profile stacks 40a-40b loaded with "shingled" layers of spouted pouches 12 with an alternating orientation along the profiles.

The operation of the invention, with particular reference to the illustrated embodiment, is as follows.

At the beginning of a processing cycle or mini-cycle, the overturning devices 30a-30b, and in particular the corresponding through regions 38, are devoid of spouted pouches 12 and the first row of accumulation guides 31' is placed horizontally and above the second row of accumulation guides 32'.

Figure 2:
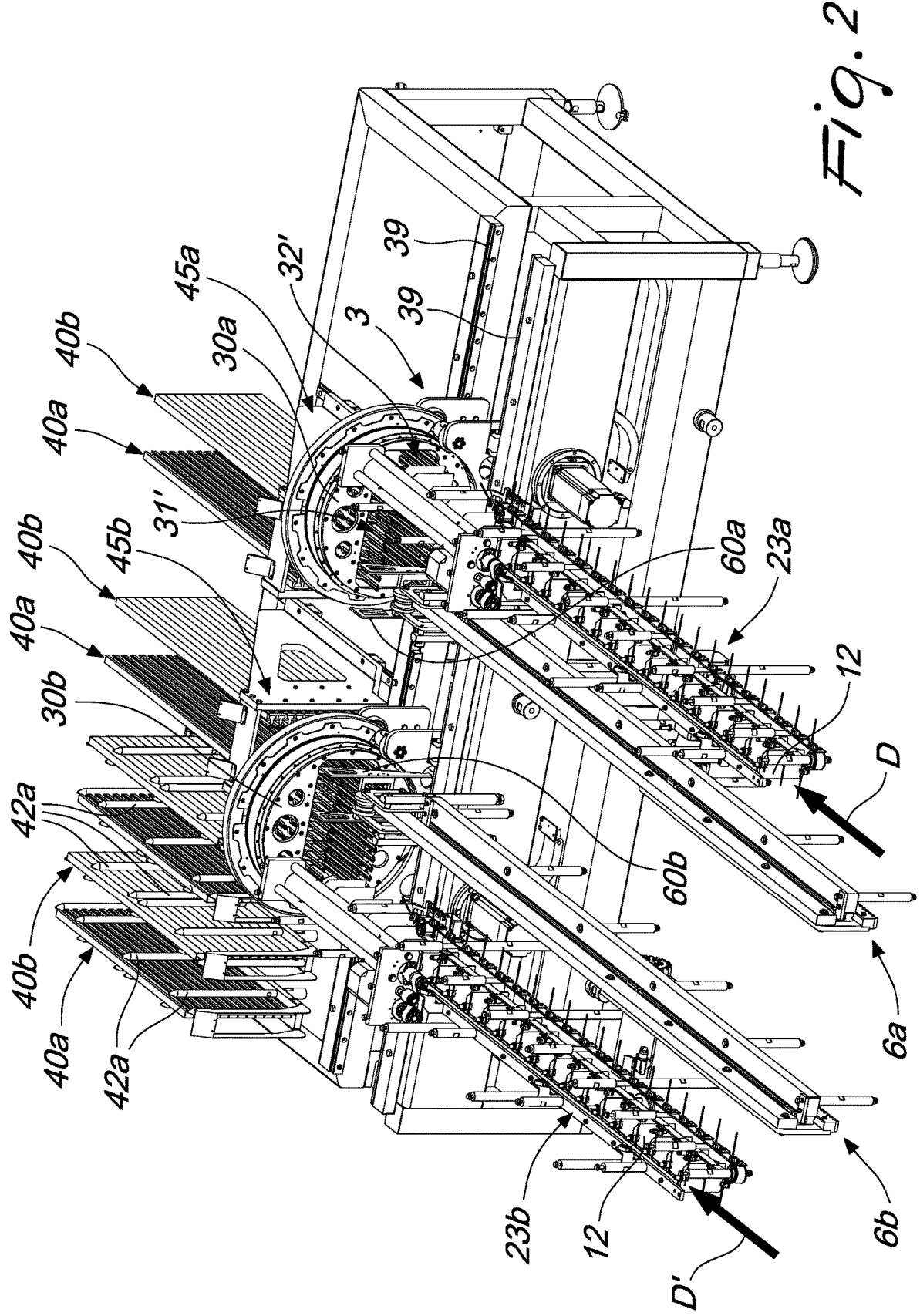
FIG. 2 is a view of a feeding-start position of a first series of pouches in the accumulation guides of the overturning devices, in order to form a first layer of pouches arranged side by side and partially superimposed.

The shuttles 34 move, or have moved, their respective overturning device 30a-30b along the rails 39, stopping it (as in FIG. 2) so that a first accumulation guide 31, the outermost one, of the first row 31' is arranged in front of the feeder 23a and above the second row of accumulation guides 32', in order to receive a first spouted pouch 12 from the screw feeder 28, which is thus inserted in the first guide 31.

The shuttle 34 then translates by one step along the rails 39 so that the next spouted pouch 12 that arrives from the screw feeder 28 is inserted in a second accumulation guide 31 alongside the first accumulation guide 31.

In the embodiment shown in the figures, the stepwise translation of the shuttles 34 of the two overturning devices 30a-30b occurs simultaneously and in opposite directions along the rails 39.

The stepwise translation of the shuttle 34 and the corresponding loading of a single pouch in a respective accumulation guide 31 thus continues for a first stroke until the first row 31' of guides of each overturning device 30a-30b is filled with a first layer of pouches 12 superimposed in a shingled arrangement.

At the end of this first stroke, the overturning devices 30a, 30b are automatically rotated through 180° about their respective axis of rotation R by the movement means, for example by the electric motor 37. This rotation is performed, for example, after the overturning devices 30a and 30b have reached an intermediate region and a terminal region of the rails 39 respectively, thus preventing, during rotation, the interference of the guides 31-32 of the overturning devices 30a-30b with the screw feeders 28.

Figure 3:
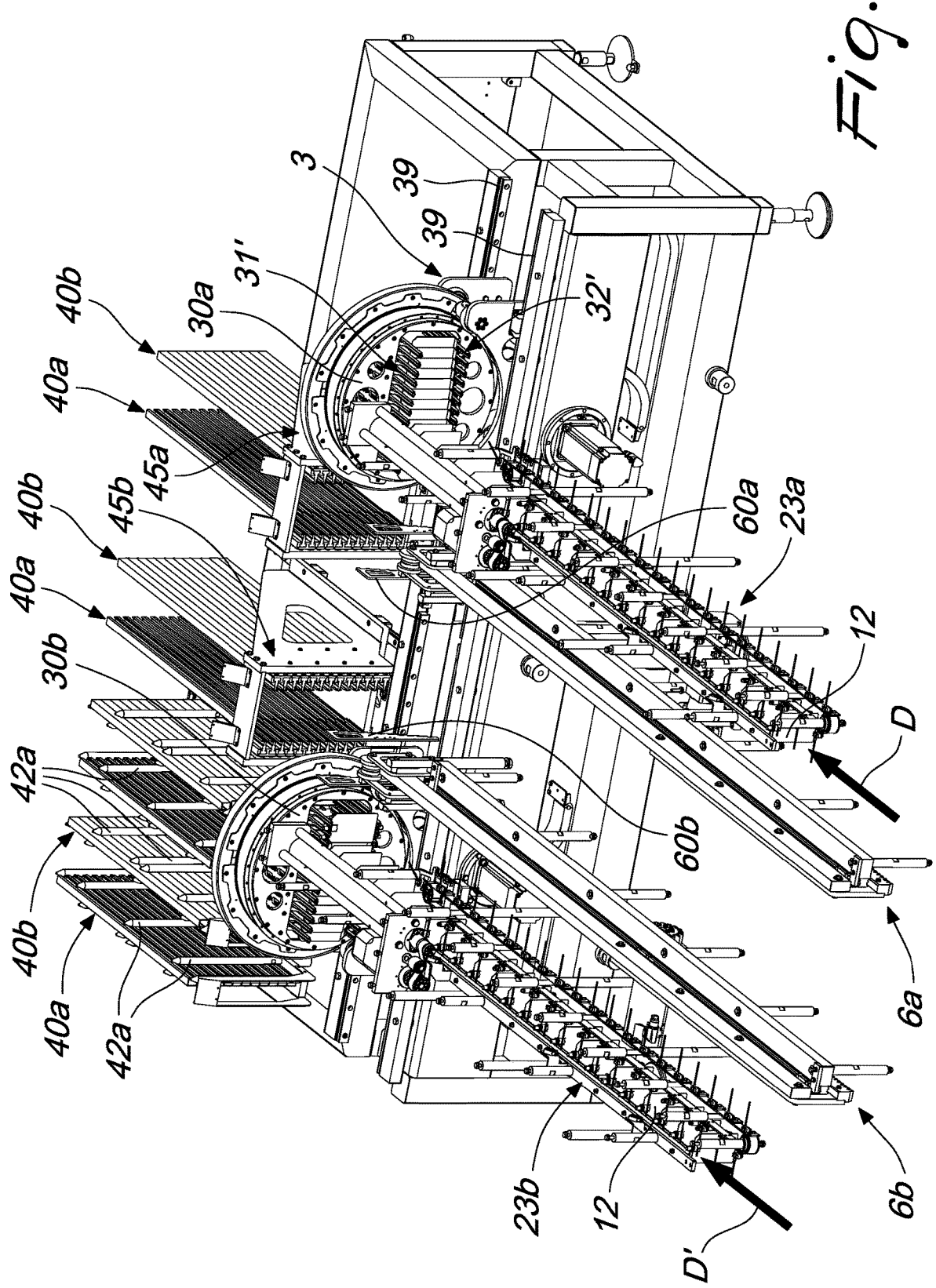
FIG. 3 is a view of the insertion of a second series of pouches in the accumulation guides of the overturning devices after a 180° rotation to form a second layer of pouches arranged side by side and partially superimposed and with an orientation that is reversed with respect to that of the pouches of the first layer.

At this point the shuttles 34 undergo a translation that is opposite to the first one (FIG. 3), again stepwise, and thus the second row 32' is also gradually filled with pouches 12 which, being always fed head-up, are inverted with respect to the layer of pouches retained by the accumulation guides of the first row 31'.

At the end of this second stroke, i.e., of the filling of the second row of guides 32' with one spouted pouch 12 for each guide 32, the through region 38 of each overturning device 30a, 30b contains two contiguous layers of pouches, in which each layer has its pouches superimposed in a shingled arrangement and with an orientation that matches that of the pouches of the other layer and is overturned with respect to it.

Figure 4:
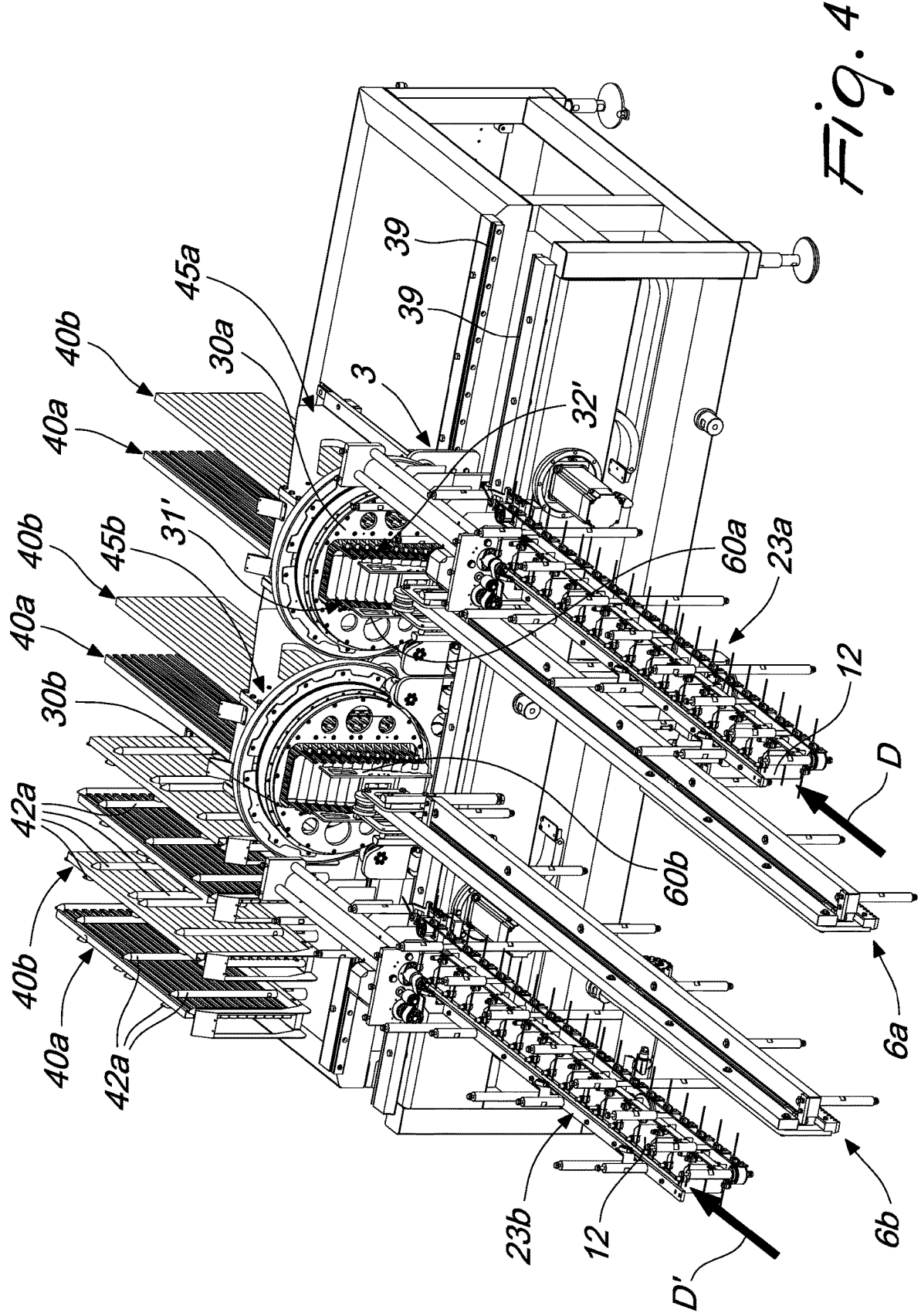
FIG. 4 is a view of the alignment of the accumulation guides with respect to two mirror-symmetrical stacks of rectilinear profiles at the profile loading station.
Figure 5:
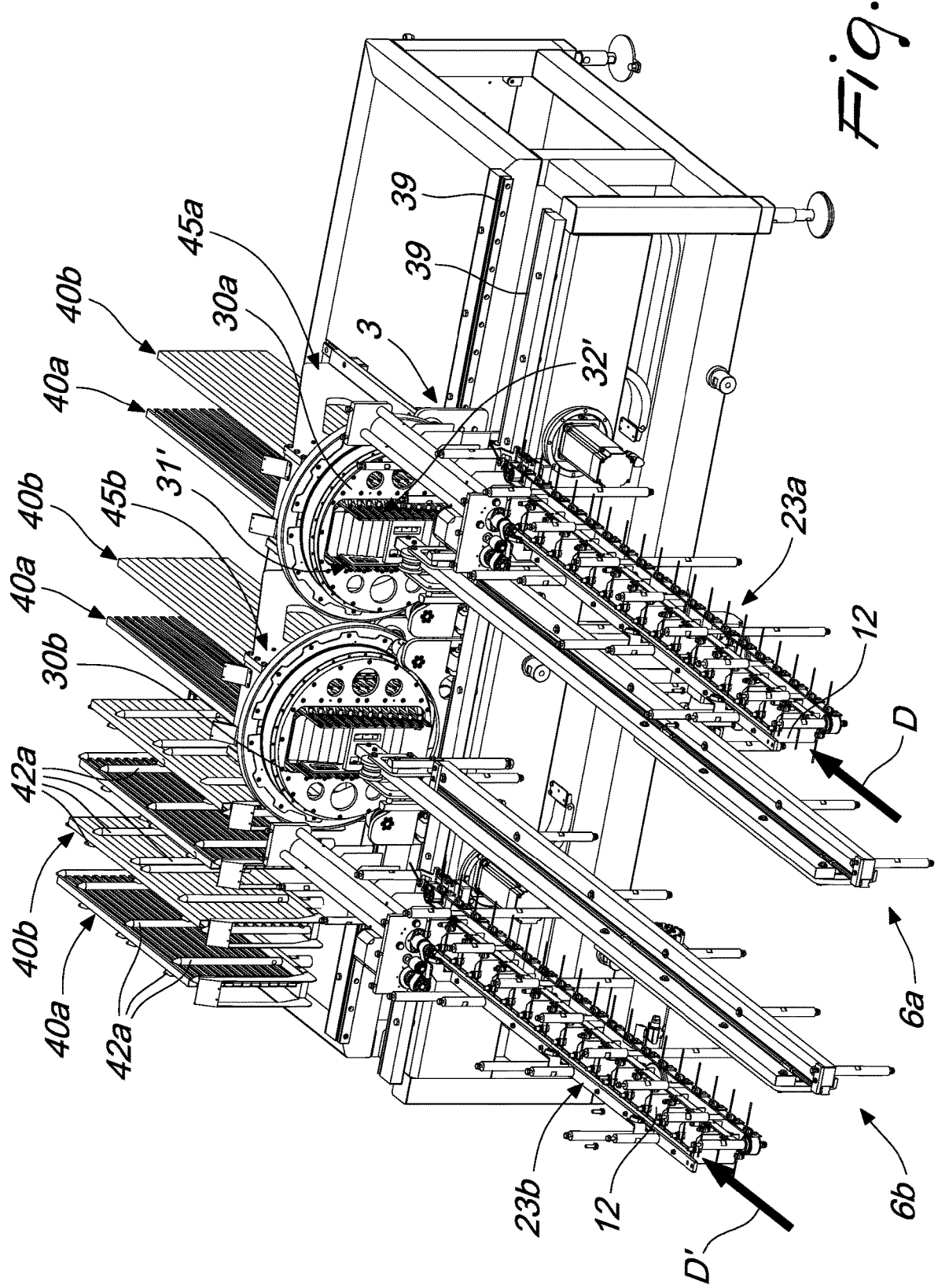
FIG. 5 is a view of the beginning of the pushing of the layers of pouches accumulated in the overturning devices toward the corresponding rectilinear profile stacks.

The overturning devices 30a, 30b, which after the filling of the second row of guides 32' can be located in the other end region and in the intermediate region of the rails 39, respectively, rotate through 90° about their respective axis of rotation R and translate along the rails 39 so as to align the through region 38 with the respective entry portal 47 of the supporting means 45a-45b of the profile stacks 40a-40b (FIG. 4).

The supporting means 45a, 45b are then moved along the direction L toward the respective overturning device 30a, 30b, thus creating a head-to-head connection between the linear guiding elements 46 and the accumulation guides 31 and 32 (which are arranged vertically).

Figure 6:
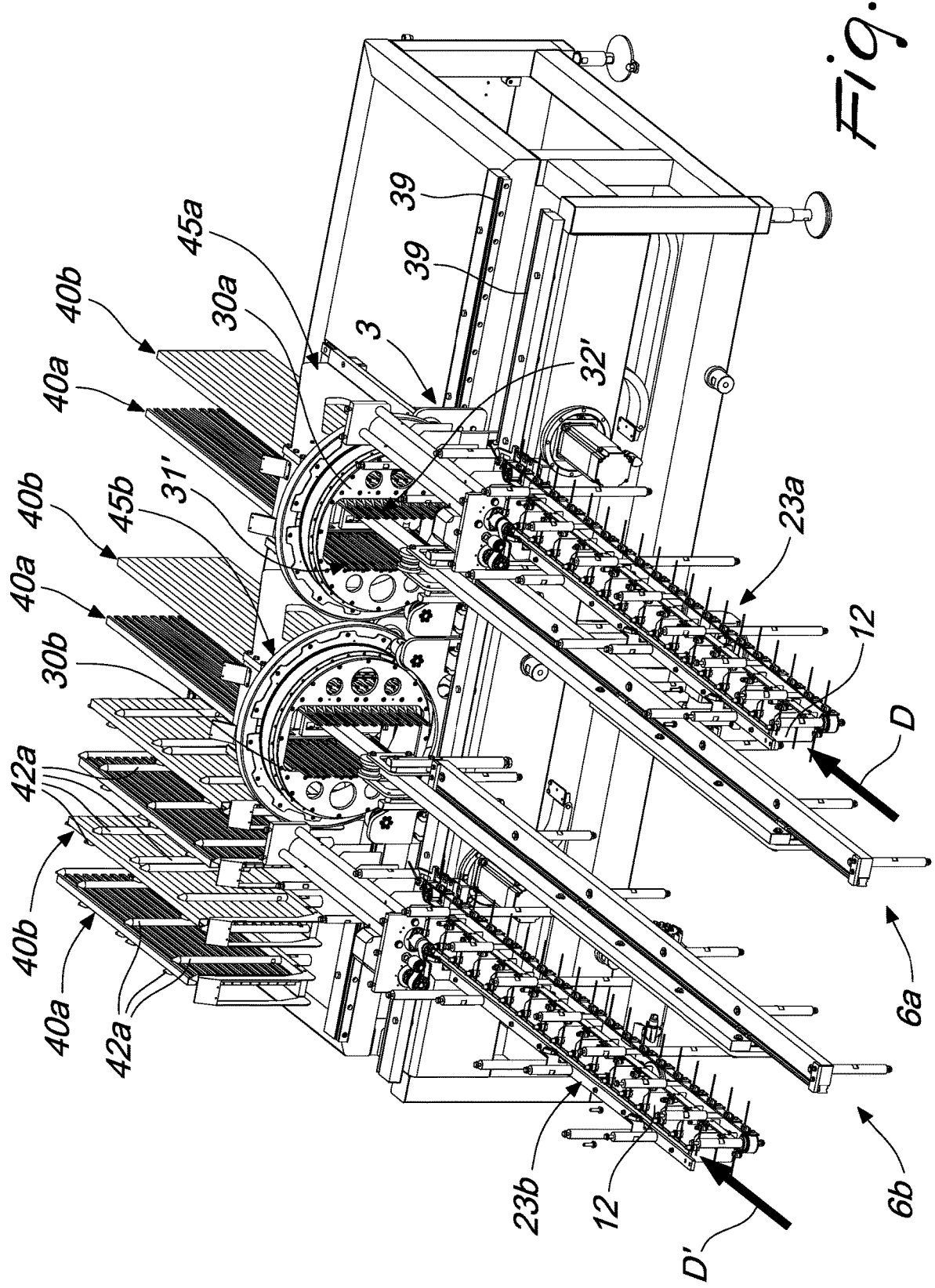
FIG. 6 is a view of an intermediate position of the pushing step of the previous figure, which brings the pouches to a buffer region.

The pusher means 6a-6b are then actuated, and the front surfaces 61 of the pusher heads 60a-60b abut against the layer of pouches 12 that is exposed toward them, evenly pushing the two layers of pouches for a predefined stroke into the portals 47 as shown in FIG. 6.

Preferably, the pusher heads 60a-60b are not made to advance past the portal 47 when the through region 38 is aligned with it, but at a later step, in particular when the overturning devices 30a-30b are returned to the cycle start position in front of the respective feeders 23a-23b to be filled with two new layers of alternating pouches. In this way, the time that would be lost in waiting for a pair of pouch layers to be pushed all the way to the end of the profiles 40 by the pusher means that pass through the through region 38 is instead utilized to fill the pass-through region 38 of the overturning devices with a new pair of pouch layers, temporarily leaving the previously generated pair of pouch layers in the portal 47.

Figure 7:
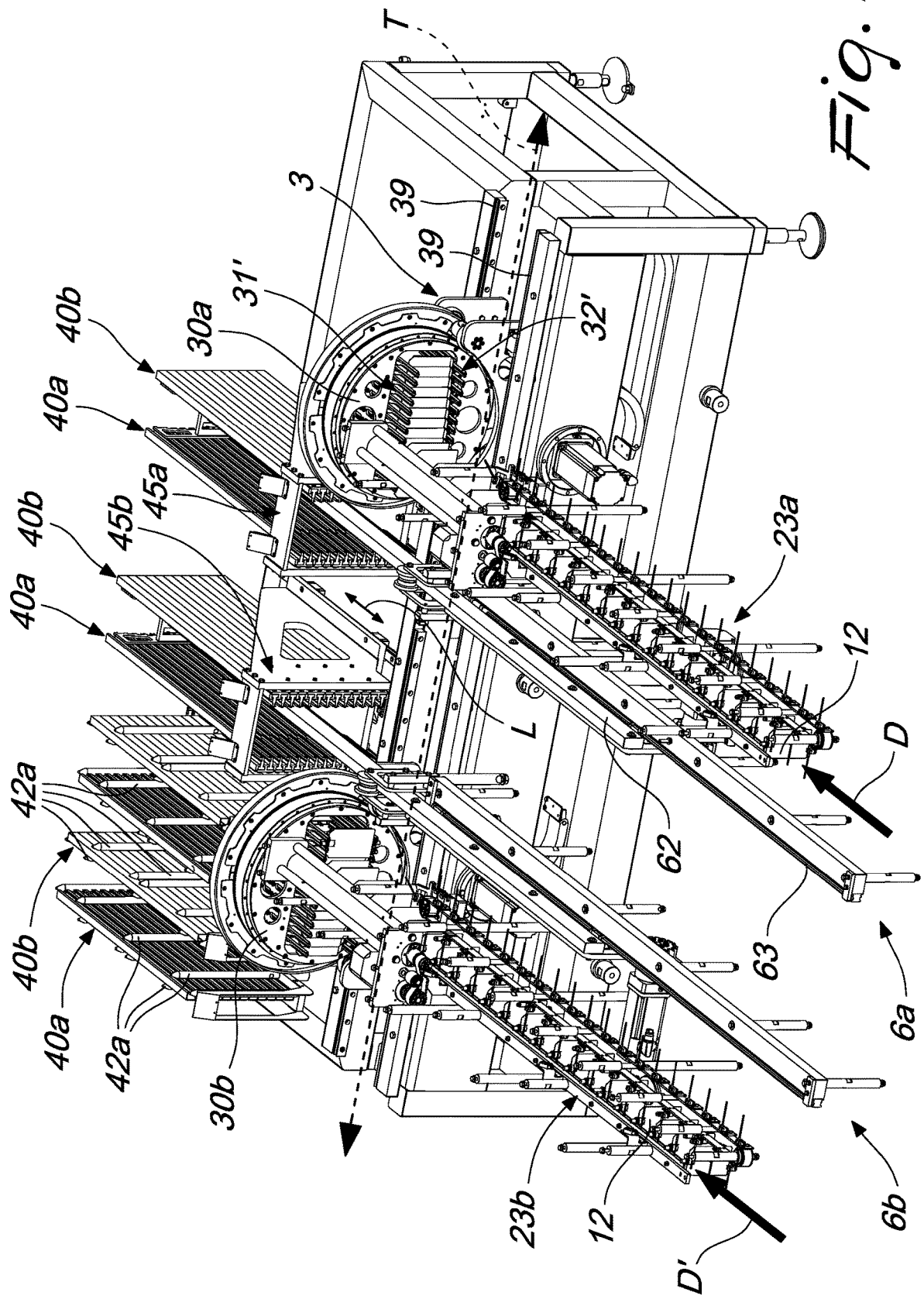
FIG. 7 is a view of the pusher of the preceding figure in the stroke limit position that can be reached during the insertion of the pouches in the overturning devices.
Figure 8:
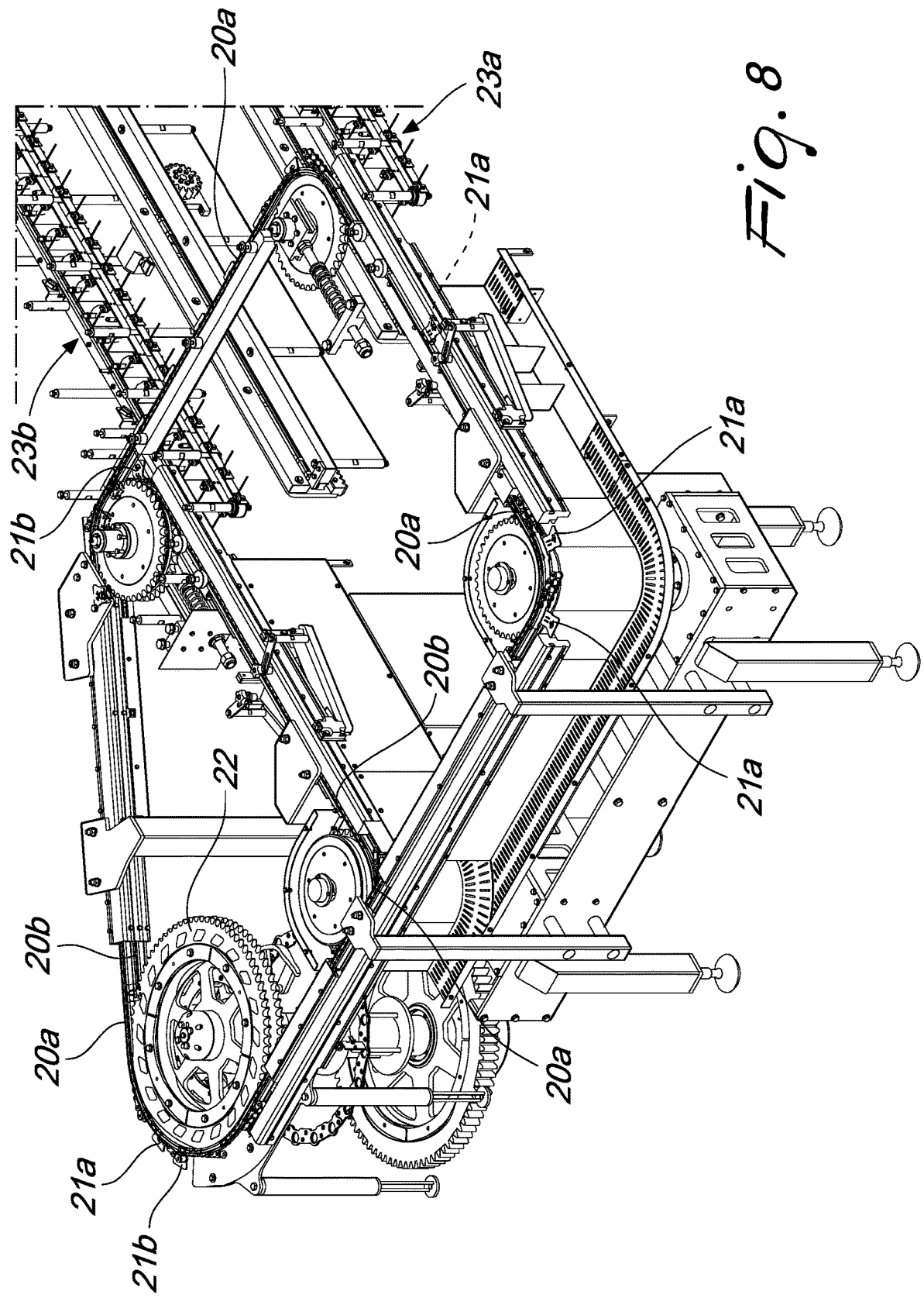
FIG. 8 is a view of a station for splitting into two parallel feeding lines a single stream of spouted pouches produced continuously upstream of the apparatus of FIG. 1.

While the through region 38 is being filled with two new layers of pouches 12 with opposite orientations, the pusher means 6a-6b can be actuated again to complete the pushing action and bring toward the opposite end of the profiles 40 of the stacks 40a-40b the alternating layers of pouches temporarily accumulated in the portal 47, as shown schematically in FIG. 7. As an alternative, multiple pairs of alternating layers of pouches can be accumulated temporarily in the portal 47 before pushing them altogether into the profiles 40.

In practice it has been found that the invention achieves the intended aim and objects.

The invention thus conceived is susceptible of numerous modifications and variations, all of which are within the scope of the inventive concept; all the details may furthermore be replaced with other technically equivalent elements.

In practice, the materials used, as well as the contingent shapes and dimensions, may be any according to the requirements and the state of the art.

The disclosures in Italian Patent Application No. 102021000032171 from which this application claims priority are incorporated herein by reference.

The invention claimed is:

1. An apparatus for inserting spouted pouches in rectilinear loading profiles adapted to support, by a spout, a plurality of said pouches, comprising:
   a pouch feeding station, which comprises at least one pouch feeder adapted to cause an advancement of a series of said pouches along a rectilinear feeding direction and according to a first orientation of the pouches;
   a profile loading station, comprising supporting means adapted to support said rectilinear loading profiles;
   an accumulation station, which is interposed between said pouch feeding station and said profile loading station, said accumulation station comprising at least one overturning device provided with accumulation guides for said spouted pouches and rotatable about a rotation axis which is substantially parallel to said feeding direction, said accumulation guides being adapted to receive said pouches with said first orientation from said at least one feeder and to modify said first orientation thereof by a rotation of the overturning device about said rotation axis, in order to allow a release of the pouches from the accumulation guides toward said profile loading station;

wherein said supporting means of the profile loading station are further adapted to support said rectilinear loading profiles so that said rectilinear loading profiles are kept longitudinally parallel to said feeding direction and superimposed with a matching orientation in at least one first stack, said accumulation guides of the at least one overturning device are substantially parallel to each other and to said rotation axis, and further comprising movement means adapted to perform at least one mutual translation between said at least one pouch feeder and said at least one overturning device, so as to load, during said at least one mutual translation, one pouch at a time of said series on a respective one of said accumulation guides.

2. The apparatus according to claim 1, wherein the accumulation guides are arranged, in said overturning device, side by side on two parallel and mutually facing rows, said rotation axis being interposed between said two mutually facing rows.

3. The apparatus according to claim 2, wherein said movement means are further configured to rotate said overturning device about said rotation axis at an end of said at least one mutual translation, so as to orient said mutually facing rows of accumulation guides parallel to said at least one first stack of profiles.

4. The apparatus according to claim 2, wherein said movement means are further configured to keep said overturning device with the mutually facing rows of accumulation guides substantially parallel to a direction of mutual translation during a first predetermined stroke of said at least one mutual translation and to rotate through 180° said overturning device about said rotation axis at an end of said first stroke, so as to allow, with said first stroke, a filling of a first row of the two mutually facing rows of guides with said pouches that arrive from the respective feeder and start, after said 180° rotation, a filling of the second row of accumulation guides with other pouches that arrive from said respective feeder.

5. The apparatus according to claim 2, wherein said supporting means of the profile loading station are adapted to support at least one second stack of said rectilinear loading profiles, said at least one second stack facing the first stack and being substantially mirror-symmetrical thereto, a distance between said first and second stacks being substantially equal to a distance between the two mutually facing rows of accumulation guides.

6. The apparatus according to claim 1, further comprising pusher means adapted to push pouches into the rectilinear loading profiles.

7. The apparatus according to claim 6, wherein said accumulation guides are arranged in a through region of said at least one overturning device, and said pusher means are adapted to pass through said through region in order to push the spouted pouches supported by the accumulation guides toward said supporting means of the profile loading station, allowing an insertion of the spouts of said pouches within said rectilinear loading profiles.

8. The apparatus according to claim 6, wherein said pusher means comprise at least one pusher head, which is configured to move along a pushing direction that is substantially parallel to said feeding direction and has at least one front surface which is oblique with respect to said pushing direction, so as to be substantially parallel to the pouches arranged side by side in partial overlap on said accumulation guides.

9. The apparatus according to claim 1, wherein said at least one feeder comprises a feeding guide configured to support said series of pouches hanging by said spout and a conveyor which is configured to move in a movement direction that is substantially parallel to said feeding guide and is provided with oscillating rods which are mutually equidistant along the conveyor and protrude from the conveyor toward the feeding guide so as to intersect the series of pouches, said rods being adapted to push a respective spouted pouch along said feeding guide with a movement of said conveyor.

* * * * *